(12) United States Patent
Chen

(10) Patent No.: US 7,908,275 B2
(45) Date of Patent: Mar. 15, 2011

(54) METHOD AND APPARATUS FOR FAST AUDIO SEARCH

(75) Inventor: Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1221 days.

(21) Appl. No.: 10/590,397

(22) PCT Filed: Jul. 3, 2006

(86) PCT No.: PCT/CN2006/001550
§ 371 (c)(1),
(2), (4) Date: Aug. 21, 2006

(87) PCT Pub. No.: WO2008/006241
PCT Pub. Date: Jan. 17, 2008

(65) Prior Publication Data
US 2009/0019025 A1    Jan. 15, 2009

(51) Int. Cl.
*G06F 7/00* (2006.01)
*G06F 17/30* (2006.01)
*G06F 15/16* (2006.01)

(52) U.S. Cl. .................... 707/737; 707/770
(58) Field of Classification Search .......... 707/737, 707/770
See application file for complete search history.

(56) References Cited

U.S. PATENT DOCUMENTS

| | | | | |
|---|---|---|---|---|
| 5,765,166 A * | 6/1998 | Gotfried et al. | ............... | 707/737 |
| 5,793,444 A * | 8/1998 | Ro | ................ | 348/719 |
| 6,181,867 B1 * | 1/2001 | Kenner et al. | ............... | 386/46 |
| 6,182,061 B1 * | 1/2001 | Matsuzawa et al. | ............ | 707/737 |
| 6,260,036 B1 * | 7/2001 | Almasi et al. | ................ | 707/737 |
| 6,269,376 B1 * | 7/2001 | Dhillon et al. | ............... | 707/737 |
| 6,381,601 B1 * | 4/2002 | Fujiwara et al. | ............. | 707/737 |

(Continued)

FOREIGN PATENT DOCUMENTS

CN    1592906 A    3/2005

(Continued)

OTHER PUBLICATIONS

Yih-Ru Wang and Chen-Yu Chiang. A New Common Component GMM-Based Speaker Recognition Method. In: IEEE International Conference on Acoustics, Speech, and Signal Processing, 2005, Proceedings. (ICASSP '05), pp. I-645-I-648, Mar. 23, 2005.*

(Continued)

*Primary Examiner* — Greta L Robinson
*Assistant Examiner* — Brian E Weinrich
(74) *Attorney, Agent, or Firm* — Trop, Pruner & Hu, P.C.

(57) ABSTRACT

According to embodiments of the subject matter disclosed in this application, a large audio database in a multiprocessor system may be searched for a target audio clip using a robust and parallel search method. The large audio database may be partitioned into a number of smaller groups, which are dynamically scheduled to available processors in the system. Processors may process the scheduled groups in parallel by partitioning each group into smaller segments, extracting acoustic features from the segments; and modeling the segments using a common component Gaussian Mixture model ("CCGMM"). One processor may also extract acoustic features from the target audio clip and model it using the CCGMM. Kullback-Leibler (KL) distance may be further computed between the target audio clip and each segment. Based on the KL distance, a segment may be determined to match the target audio clip; and/or a number of following segments may be skipped.

13 Claims, 8 Drawing Sheets

800

```
802: Initialization;
804: Partition a large audio database into NG smaller groups;
806: Establish a model for target audio clip;
808: #pragma omp parallel for schedule(dynamic,1),
     num_threads(NumOfThread);
     /* dynamically schedule smaller groups to available processors and
     start parallel processing of the scheduled groups by multiple
     processors */
810: For groupid = 0 to NG-1
812: {
814:     Partition current group into NS partially overlapped
         segments, if necessary;
816:     For segmentid = 0 to NS-1
818:     {
820:         Extract a feature vector sequence;
822:         Establish a model for the segment;
824:         Compute distance between the model of each
             segment and the target audio clip model;
826:         If Distance < threshold #1, Match!
828:         else if Distance > threshold #2,
                 Skip M segments in the same audio stream;
830:         Store results into an local array for the group;
832:     }
834: }
842: Output search results of local arrays from each processor ;
```

U.S. PATENT DOCUMENTS

| | | | |
|---|---|---|---|
| 6,453,252 B1 | 9/2002 | Laroche | 702/75 |
| 6,460,035 B1* | 10/2002 | Siegwart | 707/737 |
| 6,470,331 B1* | 10/2002 | Chen et al. | 707/737 |
| 6,496,834 B1* | 12/2002 | Cereghini et al. | 707/737 |
| 6,581,058 B1* | 6/2003 | Fayyad et al. | 707/737 |
| 2002/0129038 A1* | 9/2002 | Cunningham | 707/200 |
| 2003/0212692 A1* | 11/2003 | Campos et al. | 707/100 |
| 2004/0002935 A1* | 1/2004 | Attias | 707/1 |
| 2004/0181523 A1* | 9/2004 | Jardin | 707/3 |

FOREIGN PATENT DOCUMENTS

| | | |
|---|---|---|
| CN | 1755796 A | 4/2006 |
| TW | 220483 | 8/2004 |

OTHER PUBLICATIONS

Yurong Chen, Wei Wei, Yimin Zhang. Parallel Audio Quick Search on Shared-Memory Multiprocessor Systems. http://ieeexplore.ieee.org/stamp/stamp.jsp?arnumber=04228292. PDSEC-07. Proceedings of 21st International Parallel & Distributed Processing Symposium (IPDPS'07), Long Beach, CA, USA, Mar. 26-30, 2007, 6 pages.*

PCT/CN2006/001550 International Search Report with Written Opinion of the International Searching Authority Mailed Jan. 11, 2007.

Kunio Kashino, et al., "A Quick Search Method For Audio And Video Signals Based On Histogram Pruning," Sep. 2003, pp. 348-357.

European Patent Office, European Search Report mailed on Sep. 24, 2010 in E.P. patent application No. 06761349.7.

Yih-Ru Wang, et al., "A New Common Component GMM-Based Speaker Recognition Method," 2005 IEEE International Conference on Acoustics, Speech and Signal Processing, Mar. 18, 2005, pp. 245-248.

O. Kao, "SMP and Cluster Architectures for Retrieval of Images in Digital Libraries," Dec. 11, 2000, pp. 1-6.

Korean Intellectual Property Office, Notice of Preliminary Rejection mailed Oct. 25, 2010 in Korean patent application number 10-2009-7000034.

State Intellectual Property Office, P.R. China, First Office Action issued Oct. 13, 2010 in Chinese patent application No. 200680055729.2.

* cited by examiner

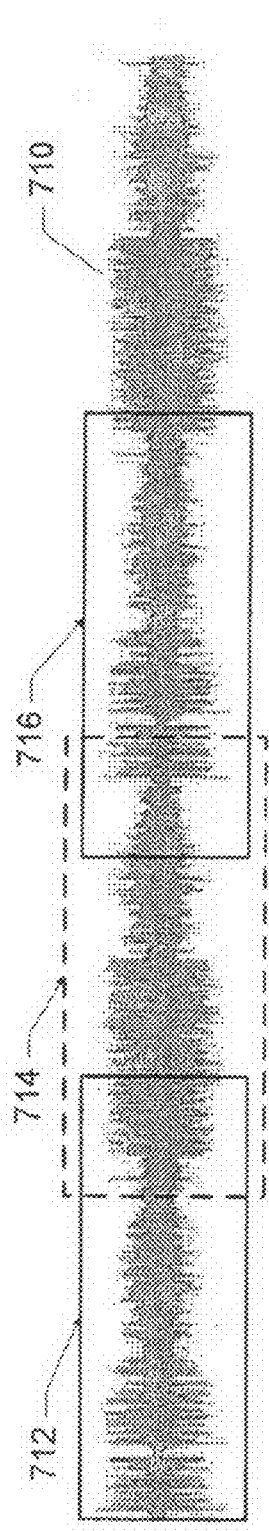
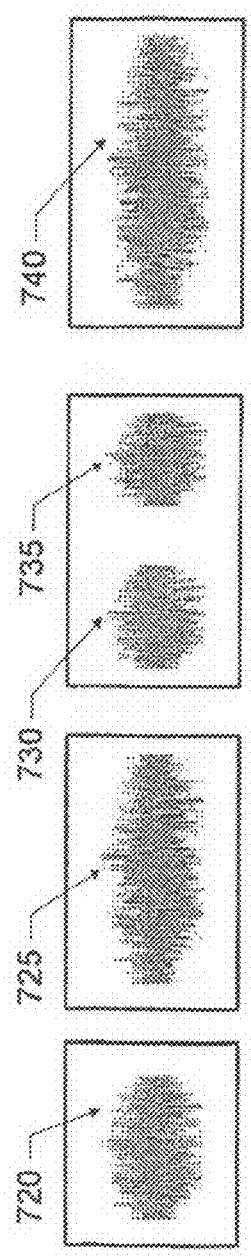
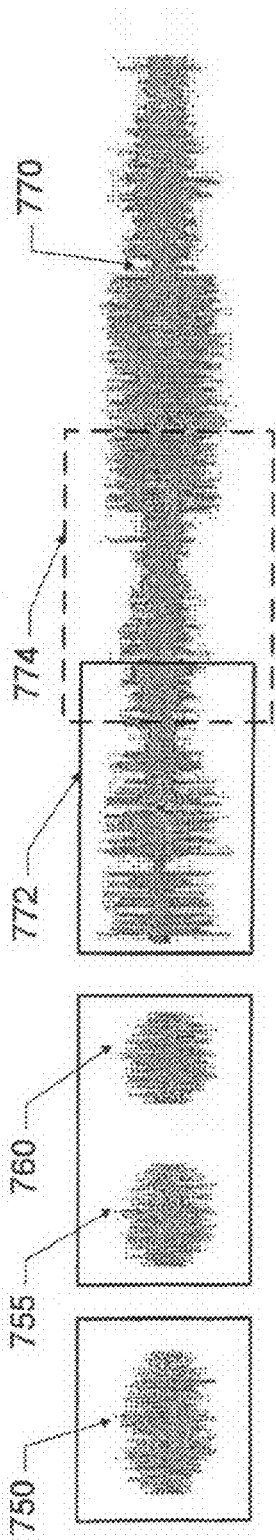
FIGURE 7A
FIGURE 7B
FIGURE 7C

800

```
802: Initialization;
804: Partition a large audio database into NG smaller groups;
806: Establish a model for target audio clip;
808: #pragma omp parallel for schedule(dynamic,1),
     num_threads(NumOfThread);
     /* dynamically schedule smaller groups to available processors and
     start parallel processing of the scheduled groups by multiple
     processors */
810: For groupid = 0 to NG-1
812: {
814:     Partition current group into NS partially overlapped
         segments, if necessary;
816:     For segmentid = 0 to NS-1
818:     {
820:         Extract a feature vector sequence;
822:         Establish a model for the segment;
824:         Compute distance between the model of each
             segment and the target audio clip model;
826:         If Distance < threshold #1, Match!
828:         else if Distance > threshold #2,
                 Skip M segments in the same audio stream;
830:         Store results into an local array for the group;
832:     }
834: }
842: Output search results of local arrays from each processor ;
```

FIGURE 8

METHOD AND APPARATUS FOR FAST AUDIO SEARCH

This U.S. application claims priority to Pending International Application Number PCT/CN2006/001550, filed PCT in China on Jul. 3, 2006.

BACKGROUND

1. Field

This disclosure relates generally to signal processing and multimedia applications, and more specifically but not exclusively, to methods and apparatus for fast audio search and audio fingerprinting.

2. Description

Audio search (e.g., searching a large audio stream for an audio clip, even if the large audio stream is corrupted/distorted) has many applications including analysis of broadcast music/commercials, copyright management over the Internet, or finding metadata for unlabeled audio clips, and etc. A typical audio search system is serial and designed for single processor systems. It normally takes a long time for such a search system to search for a target audio clip in a large audio stream. In many cases, however, an audio search system is required to work efficiently on large audio databases, e.g., to search large databases in a very short time (e.g., close to real-time). Additionally, an audio database may be partially or entirely distorted, corrupted, and/or compressed. This requires that an audio search system be robust enough to identify those audio segments that are the same as the target audio clip, even if those segments may be distorted, corrupted, and/or compressed. Thus, it is desirable to have an audio search system which can quickly and robustly search large audio databases for a target audio clip.

BRIEF DESCRIPTION OF THE DRAWINGS

The features and advantages of the disclosed subject matter will become apparent from the following detailed description of the subject matter in which:

FIGS. 7A, 7B, and 7C illustrate a method of partitioning a large audio database into smaller groups for robust and parallel audio search in a multiprocessor system; and FIG. 8 is pseudo code illustrating an example process for performing robust and parallel audio search in a multiprocessor system.

DETAILED DESCRIPTION

According to embodiments of the subject matter disclosed in this application, a large audio stream or a large audio database in a multiprocessor system may be searched for a target audio clip using a robust and parallel search method. The large audio database may be partitioned into a number of smaller groups. These smaller groups may be dynamically scheduled to be processed by available processors or processing cores in the multiprocessor system. Processors or processing cores may process the scheduled groups in parallel by partitioning each group into smaller segments, extracting acoustic features from the segments; and modeling the segments using a common component Gaussian Mixture model ("CCGMM"). The length of these segments may be the same as the length of the target audio clip. Before processing any group, one processor or processing core may extract acoustic features from the target audio clip and model it using the CCGMM. A Kullback-Leibler (KL) or KL-max distance may be further computed between the model of the target audio clip and each segment of a group. If the distance equals or smaller than a predetermined value, the corresponding segment is identified as the target audio clip.

If the distance is larger than a predetermined value, the processor or processing core may skip a certain number of segments and continue searching for the target audio clip. Once a processor or processing core finishes searching a group, a new groups may be given to it for processing to search for the target audio clip until all of the groups are searched. The size of the groups may be determined in such a way to reduce the load imbalance and the overlapped computation. Furthermore, Input/Output (I/O) may be optimized to improve the efficiency of parallel processing of audio groups by multiple processors or processing cores.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
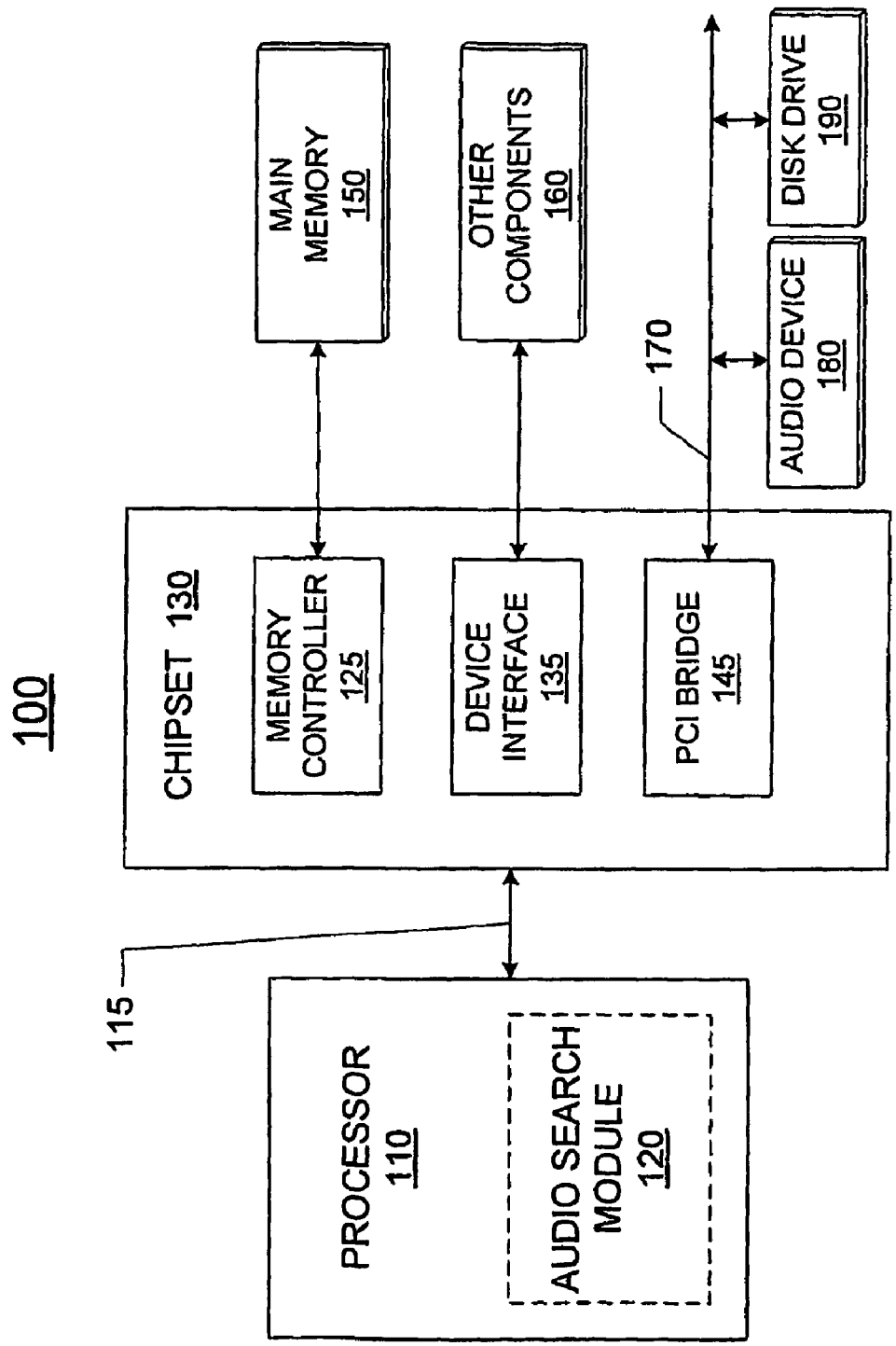
FIG. 1 shows one example computing system where robust and parallel audio search may be performed using an audio search module.

FIG. 1 shows one example computing system 100 where robust and parallel audio search may be performed using an audio search module 120. Computing system 100 may comprise one or more processors 110 coupled to a system interconnect 115. Processor 110 may have multiple or many processing cores (for brevity of description, term "multiple cores" will be used hereinafter to include both multiple processing cores and many processing cores). Processor 110 may include an audio search module 120 to conduct robust and parallel audio search by multiple cores. The audio search module may comprise several components such as a partitioning mechanism, a schedule, and multiple audio searchers (see more detailed description for FIGS. 4-6 below). One or more components of the audio search module may be located in one core with others in another core.

The audio search module may first partition a large audio database into multiple smaller groups or a large audio stream into smaller partially overlapped substreams. Second, one core may process an audio clip to be searched for ("target audio clip") to establish a model for the target audio clip. In the mean while, the audio search module dynamically schedules smaller audio groups/substreams to multiple cores, which partition each group/substream into segments and establish a model for each audio segment, in parallel. The size of each segment may be equal to the size of the target audio clip. A Gaussian mixture model ("GMM") with multiple Gaussian components, which are common to all of the audio segments including both the target audio clip and the audio database/stream, may be used for modeling each audio segment and the target audio clip. Once a model is established for an audio segment, Kullback-Leibler ("KL") or KL-max distance may be computed between the segment model and the target audio clip model. If the distance is not larger than a predetermined value, the audio segment may be identified as the target audio clip. The search process may continue until all audio groups/substreams are processed.

The computing system 100 may also include a chipset 130 coupled to the system interconnect 115. Chipset 130 may include one or more integrated circuit packages or chips. Chipset 130 may comprise one or more device interfaces 135 to support data transfers to and/or from other components 160 of the computing system 100 such as, for example, BIOS firmware, keyboards, mice, storage devices, network interfaces, etc. Chipset 130 may be coupled to a Peripheral Component Interconnect (PCI) bus 170. Chipset 130 may include a PCI bridge 145 that provides an interface to the PCI bus 170. The PCI Bridge 145 may provide a data path between the processor 110 as well as other components 160, and peripheral devices such as, for example, an audio device 180 and a disk drive 190. Although not shown, other devices may also be coupled to the PCI bus 170.

Additionally, chipset 130 may comprise a memory controller 125 that is coupled to a main memory 150. The main memory 150 may store data and sequences of instructions that are executed by multiple cores of the processor 110 or any other device included in the system. The memory controller 125 may access the main memory 150 in response to memory transactions associated with multiple cores of the processor 110, and other devices in the computing system 100. In one embodiment, memory controller 150 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Figure 2:
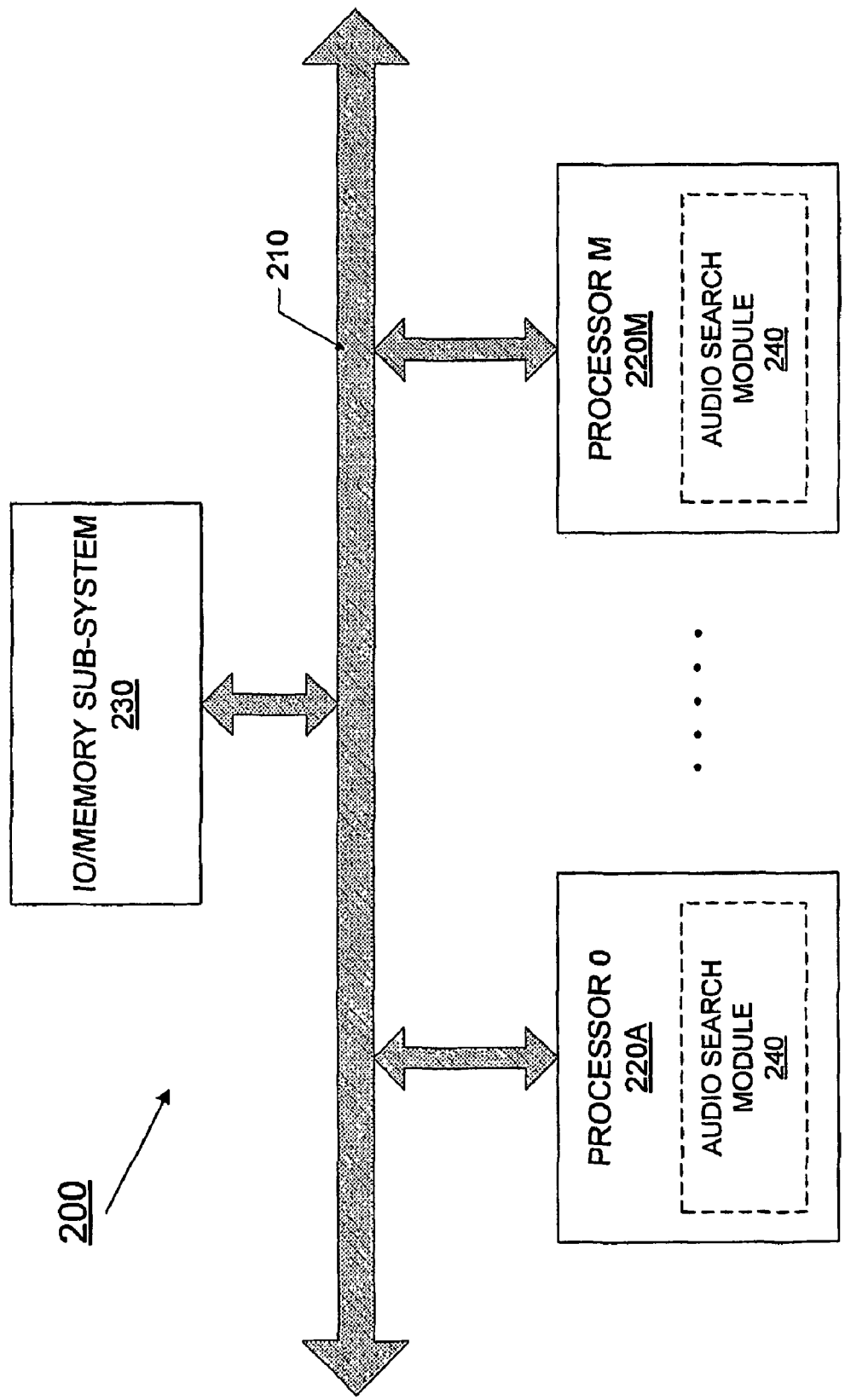
FIG. 2 shows another example computing system where robust and parallel audio search may be performed using an audio search module.

FIG. 2 shows another example computing system 200 where robust and parallel audio search may be performed using an audio search module 240. System 200 may comprise multiple processors such as processor0 220A. One or more processors in system 200 may have many cores. System 200 may include an audio search module 240 to conduct robust and parallel audio search by multiple cores. The audio search module may comprise several components such as a partitioning mechanism, a schedule, and multiple audio searchers (see more detailed description for FIGS. 4-6 below). One or more components of the audio search module may be located in one core with others in another core. Processors in system 200 may be connected to each other using a system interconnect 210. System interconnect 210 may be a Front Side Bus (FSB). Each processor may be connected to Input/Output (IO) devices as well as memory 230 through the system interconnect. All of the cores may receive audio data from memory 230.

Figure 3:
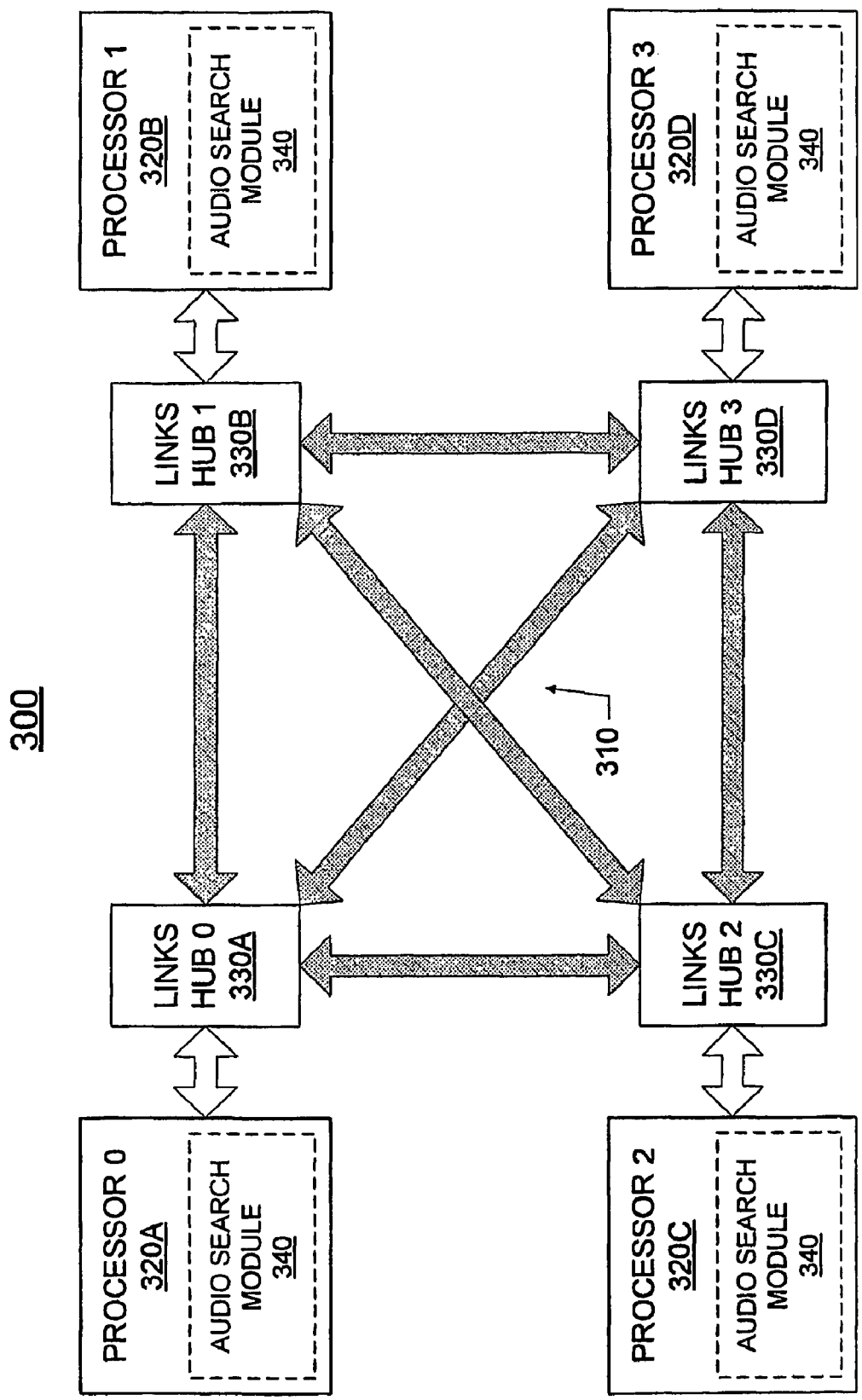
FIG. 3 shows yet another example computing system where robust and parallel audio search may be performed using an audio search module.

FIG. 3 shows yet another example computing system 300 where robust and parallel audio search may be performed using an audio search module 340. In system 300, system interconnect 310 that connects multiple processors (e.g., 320A, 320B, 320C, and 320D) is a links-based point-to-point connection. Each processor may connect to the system interconnect through a links hub (e.g., 330A, 330B, 330C, and 330D). In some embodiments, a links hub may be co-located with a memory controller, which coordinates traffic to/from a system memory. One or more processor may have many cores. System 300 may include an audio search module 340 to conduct robust and parallel audio search by multiple cores. The audio search module may comprise several components such as a partitioning mechanism, a schedule, and multiple audio searchers (see more detailed description for FIGS. 4-6 below). One or more components of the audio search module may be located in one core with others in another core. Each processor/core in system 300 may be connected to a shared memory (not shown in the figure) through the system interconnect. All of the cores may receive audio data from the shared memory.

In FIGS. 2 and 3, the audio search module (i.e., 240 and 340) may first partition a large audio database into multiple smaller groups or a large audio stream into smaller partially overlapped substreams. Second, one core may process an audio clip to be searched for ("target audio clip") to establish a model for the target audio clip. In the mean while, the audio search module dynamically schedules smaller audio groups/substreams to multiple cores, which partition each group/substream into segments and establish a model for each audio segment, in parallel. The size of each segment may be equal to the size of the target audio clip. A Gaussian mixture model ("GMM") with multiple Gaussian components, which are common to all of the audio segments including both the target audio clip and the audio database/stream, may be used for modeling each audio segment and the target audio clip. Once a model is established for an audio segment, Kullback-Leibler ("KL") or KL-max distance may be computed between the segment model and the target audio clip model. If the distance is not larger than a predetermined value, the audio segment may be identified as the target audio clip. The search process may continue until all audio groups/substreams are processed.

Figure 4:
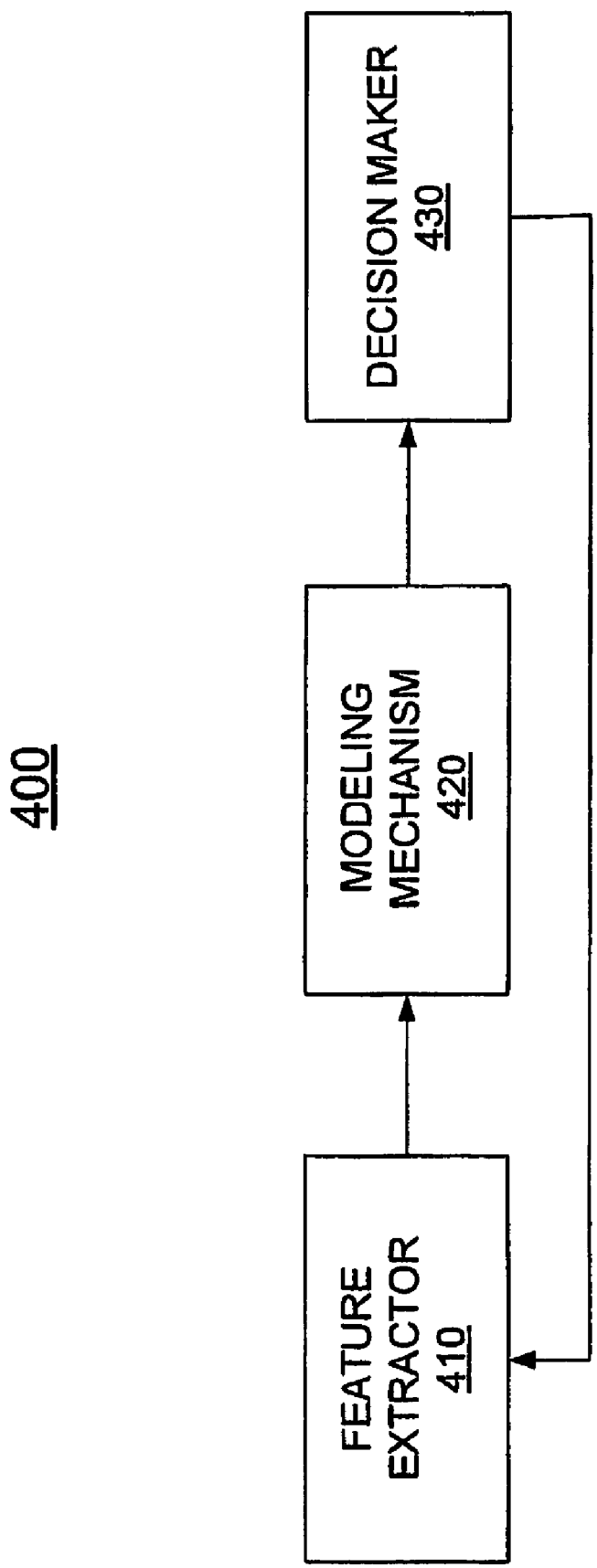
FIG. 4 is a block diagram of an example audio search module that performs robust audio search.

FIG. 4 is a block diagram of an example audio search module 400 that performs robust audio search. Audio search module 400 comprises a feature extractor 410, a modeling mechanism 420, and a decision maker 430. Feature extractor 410 may receive an input audio stream (e.g., a target audio clip, a substream of a large audio stream, etc.) and extract acoustic features from the input audio stream. When the input audio stream is an audio stream to be searched for the target audio clip, the feature extractor may apply sliding window on the audio stream to partition it into multiple overlapped segments. The window has the same length as the target audio clip. Each segment of the input audio stream (the target audio stream has only one segment) is further separated into frames. Each frame may have the same length and may overlap with its neighboring frames. For example, in one embodiment, a frame may be 20 milliseconds in length with the overlap between frames being 10 milliseconds. A feature vector may be extracted for each frame, which may include such features as Fourier coefficients, Mel-Frequency cepstral coefficients, spectral flatness, and means, variances, and other derivatives thereof. Feature vectors from all of the frames in an audio segment form a feature vector sequence.

The overlap between two adjacent segments is to reduce the likelihood of missing any target audio clip between two adjacent segments. The longer the overlap is, the less likely a miss is. In one embodiment, the overlap may be equal to the length of a segment minus the length of a frame to avoid missing any match. However, longer overlap means more computation. Thus, there should be a balance between the computation load and the likelihood of miss (e.g., the overlap is equal to or less than ½ of the segment length). In any case, feature vectors for frames that are overlapped between two segments only need to be extracted once.

Modeling mechanism 420 may establish a model for an audio segment based on its feature vector sequence extracted by feature extractor 410. Depending on what model is used, the modeling mechanism will estimate parameters for the model. In one embodiment, a common component Gaussian mixture model ("CCGMM") may be used for modeling an audio segment. The CCGMM includes multiple Gaussian components which are common across all of the segments. For each segment, the modeling mechanism estimates a specific set of mixture weights for the common Gaussian components. In another embodiment, other models (e.g., hidden Markov model) may be used for modeling an audio segment. In one embodiment, only the target audio clip may be modeled; and the feature vector sequence of an audio segment may be directly used to determine whether the audio segment is substantially the same as the target audio clip.

Decision maker 430 may determine whether an audio segment in the input audio stream is sufficiently similar so that the audio segment can be identified as a copy of the target audio clip. To achieve this goal, the decision maker may derive a similarity measure by comparing the model of the audio segment and the model of the target audio clip. In one embodiment, the similarity measure may be a distance computed between the two models. In another embodiment, the similarity measure may be probability of the audio segment model being the same as the target audio clip model. Yet in another embodiment, the similarity measure may be derived by comparing the feature vector sequence of the audio segment and the model of the target audio clip. For example, when a hidden Markov model ("HMM") is used to model the target audio clip, a Viterbi based algorithm may be used to compute a likelihood score between the audio segment and the target audio clip, based on the feature vector sequence of the audio segment and the HMM of the target audio clip.

Based on the value of the similarity measure, the decision maker may determine whether an audio segment can be identified as the target audio clip. For example, if the value of the similarity measure is not larger than a predetermined threshold (e.g., similarity measure is distance between the audio segment model and the target audio clip), the audio segment may be identified as substantially the same as the target audio clip. Similarly, the audio segment may be identified as substantially the same as the target audio clip if the value of the similarity measure is not smaller than a predetermined threshold (e.g., similarity measure is a likelihood score of the audio segment being substantially the same as the target audio clip). On the other hand, if an audio segment is found to be substantially different from the target audio clip based on the similarity measure, a certain number of segments immediately following the audio segment may be skipped. The actual number of segments to be skipped will depend on the value of the similarity measure and/or empirical data. By skipping a number of following segments, it is not likely to miss any target audio clip when the similarity measure indicate the current segment is so different from the target audio clip because the window used to partition an input audio stream into segments slides forward gradually and as a result, there is continuity of similarity measure from one segment to the next.

Figure 5:
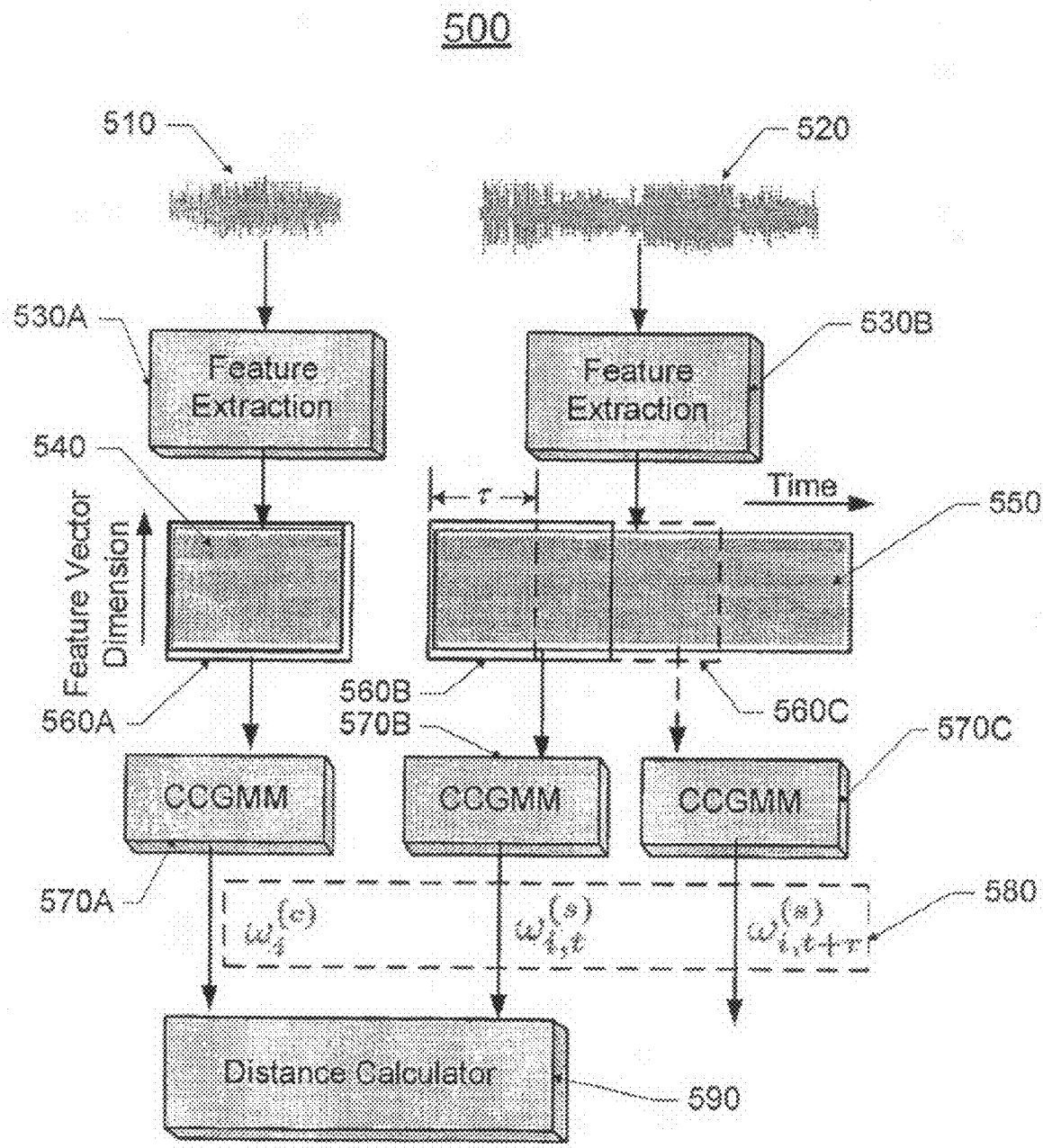
FIG. 5 is an example illustrating how a robust audio search module shown in FIG. 4 works.

FIG. 5 is an example illustrating how a robust audio search module shown in FIG. 4 works. A target audio clip 510 is received by a feature extractor which segments it into frames and produces a feature vector sequence (540) at block 530A, with a feature vector per frame. A feature vector may be an x dimensional vector (wherein x>=1) because the feature vector may include one or more parameters. At block 570A, Feature vector sequence 540 may be modeled using a GMM as shown below:

$$P^{(k)}(x) = \sum_{i=1}^{M} w_i^{(k)} N\left(x \mid \mu_i^{(k)}, \sum_i^{(k)}\right). \quad (1)$$

The GMM, $P^{(k)}(x)$, includes M Gaussian components with component weights $w_i^{(k)}$, means $\mu_i^{(k)}$, and covariance $$\sum_i^{(k)},$$

with i=1, 2, ..., M; wherein k denotes segment k and N( ) denotes a Gaussian distribution. For the target audio clip, there is only one segment, and hence there is no need to use k to identify a segment. For the input audio stream 520, however, there is typically more than one segment, and it is thus desirable to identify the GMM for different segments.

In the example shown in FIG. 5, Kullback-Leibler (KL) or KL-max distance is used as a similarity measure. To simplify KL-max distance computation, it is assumed that the GMMs used for all the audio segments share a common set of Gaussian components, i.e., for the $i^{th}$ Gaussian component, the mean ($\mu_i$) and variance ($\Sigma_i$) are the same across different audio segments.

As a result, Equation (1) becomes:

$$P^{(k)}(x) = \sum_{i=1}^{M} w_i^{(k)} N\left(x \mid \mu_i, \sum_i\right). \quad (2)$$

For each audio segment, only a set of weights, $W_i^{(k)}$, i=1, 2, ..., M, need to be estimated for the common Gaussian components. Given a feature vector sequence for segment k, which has T feature vectors, $x_t$(t=1, 2, ..., T), weights may be estimated as follows, $$w_i^{(k)} = \frac{1}{T}\sum_{t=1}^{T} \frac{w_i^{(u)} N\left(x_t \mid \mu_i, \sum_i\right)}{\sum_{j=1}^{M} w_j^{(u)} N\left(x_t \mid \mu_j, \sum_j\right)}, \quad (3)$$

wherein $w_i^{(u)}$ or $w_j^{(u)}$ is a universal weight for the $i^{th}$ or $j^{th}$ segment, which may be obtained by experiments based on some sample audio files or be initialized with a random value.

An input audio stream 520, which is to be searched for the target audio clip 510, may be received by a feature extractor. At block 530B, the feature extractor partitions the input audio stream into partially overlapped segments. For each segment, the feature extractor further partitions the segment into multiple partially overlapped frames and extracts a feature vector from each frame. Block 560 shows a feature vector sequence for the input audio stream 520 and also illustrates how the audio stream is partitioned into partially overlapped segments. For example, a window with the size being the same as the length of the target audio clip may be applied to input audio stream 520. For illustration purpose, a window is shown for the feature vector sequence of the target audio clip to obtain a segment 560A although there is typically no need to apply a window to the target audio clip since there is only one segment. A shifting window is applied to the input audio stream to obtain multiple partially overlapped segments such as 560B and 560C. The window shifts by time τ from segment 560B to segment 560C, where r is smaller than the window size.

Each audio segment is modeled using the CCGMM, for example, segment 560B is modeled at block 570B and segment 560C is modeled at block 570C. Models for each segment of input audio stream 520 and for target audio clip 510 have common Gaussian components with different sets of weights. In one embodiment, feature vectors may be extracted from the entire input audio stream frame by frame to produce a long feature vector sequence for the entire input audio stream. A window with a length being N×FL (where N is a positive integer and FL is the frame length) is subsequently applied to the long feature vector sequence. Feature vectors within the window constitute a feature vector for an audio segment, which is used to establish a CCGMM. The window is shifting forward by r time.

To determine if a segment is substantially the same as the target audio clip, KL-max distance may be calculated between the model of the segment and the target audio clip as follows, $$d_{KLMAX} = \max_{i=1,2,\ldots,M} (w_i^{(1)} - w_i^{(2)}) \log \frac{w_i^{(1)}}{w_i^{(2)}}. \quad (4)$$

If the KL-max distance so calculated is below a predetermined threshold, the audio clip may be considered to be detected. As the window applied over input audio stream 520 shifts forward in time, distances typically show certain continuity from one time-step to the next. In other words, if the distance is too large, it is unlikely that one or more segments immediately following the current segment matches the target audio clip. Thus, depending on the value of the distance, a certain number of immediately following segments in the same audio stream/substream may be skipped from search.

Figure 6:
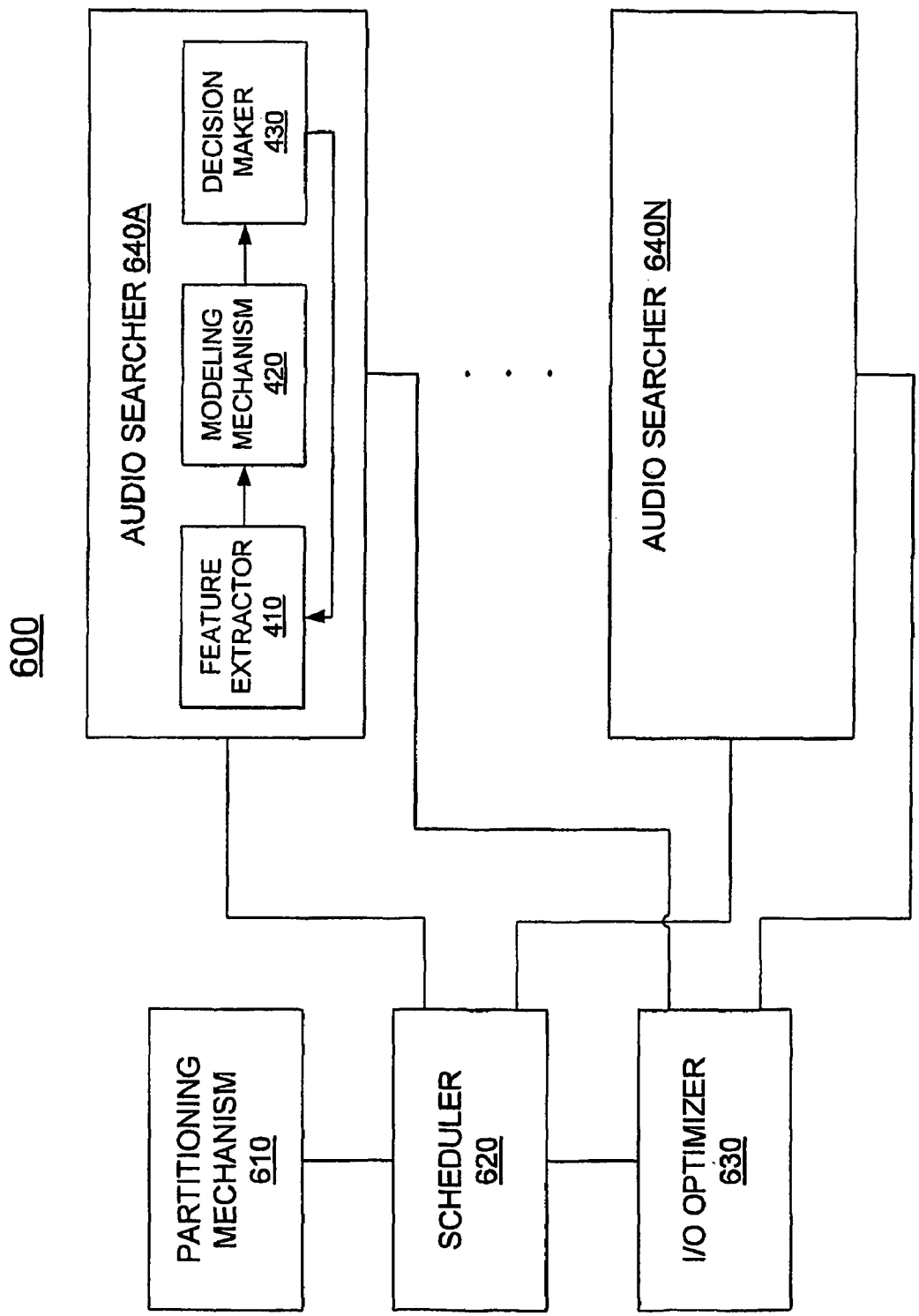
FIG. 6 is a block diagram of an example audio search module that performs robust and parallel audio search in a multiprocessor system.

FIG. 6 is a block diagram of an example audio search module 600 that performs robust and parallel audio search in a multiprocessor system. The audio search module 600 comprises a partitioning mechanism 610, a scheduler 620, an I/O optimizer 630, and a plurality of audio searchers (e.g., 640A, ..., 640N). Partitioning mechanism 610 may partition a large audio stream into multiple smaller substreams and/or a large audio database into multiple smaller groups. FIGS. 7A, 7B, and 7C illustrate a method of partitioning a large audio database into smaller groups for robust and parallel audio search in a multiprocessor system. FIG. 7A shows an example database that contains a single large audio stream 710. The partitioning mechanism may partition audio stream 710 into multiple smaller substreams such as 712, 714, and 716, with each substream constituting a group. The length of substreams can vary from each other, but it is normally uniform for the simplicity purpose. To avoid missing any correct detection of a target audio clip, each substream overlaps with its immediately following substream; and the overlap between two adjacent substreams (e.g., 712 and 714, 714 and 716) should equal or longer than FNClip−1, where FNClip is the total number of frames in the target audio clip.

FIG. 7B shows another example database that includes multiple relatively small audio streams (e.g., 720, 725, 730, 735, and 740). In one embodiment, partitioning mechanism 610 may partition the database into multiple smaller groups with each group consisting of only one audio stream. In another embodiment, the partitioning mechanism may partition the database into multiple smaller groups with some groups each consisting of only one audio stream and with others each consisting of more than one small audio stream, as illustrated in FIG. 7B. FIG. 7C shows yet another example database that includes some relatively small audio streams (e.g., 750, 755, and 760) as well as some large audio stream (e.g., 770). The partitioning mechanism may put those relatively small audio streams into groups with each group consisting of only one audio stream or with some groups consisting of only one audio stream (e.g., 750) while others consisting of more than one small audio streams (e.g., 755 and 760 may be grouped together). As for a large audio stream such as 770, the partitioning mechanism may partition it into multiple partially overlapped smaller substreams (e.g., 712 and 714) with each substream constituting a group, using the method illustrated in FIG. 7A.

Additionally, the partitioning mechanism partitions a large audio database into groups with proper sizes to reduce the overlapped computation (in the situation where a large audio stream is partitioned into multiple overlapped smaller substreams) and load imbalance in parallel processing by multiple processors. Smaller group size may result in large overlapped computation, while larger group size may result in considerable load imbalance. In one embodiment, the group size may be about 25 times of the size of the target audio clip.

Turning back to FIG. 6, scheduler 620 may dynamically schedule multiple groups of a large database into multiple processors in the multiprocessor system with each processor having one group to process at one time. The scheduler periodically checks the availability of processors in the system and assigns an audio group for each available processor to process and search for the target audio clip. If another processor becomes available later, the scheduler may assign one group to this processor. The scheduler also assigns an unsearched audio group to processor immediately after it finishes searching its previously assigned group no matter whether other processors finish their searching. In fact, even for groups with the same size, searching for the same target audio clip may take different amount of time for different processors because the number of segments to be skipped may be different from one segment to another. Using dynamic scheduling as outlined above may further reduce load imbalance effectively.

I/O optimizer 630 may optimize I/O traffic on the system interconnect (e.g., system bus connecting a shared system memory with processors in the system). The I/O optimizer may decide not to load the entire audio database to be searched for from the disk into the memory in the beginning while the data range for each processor is being defined. Additionally, the I/O optimizer may let each processor read only a portion of its assigned segment from the memory at one time. By optimizing the I/O traffic, the I/O optimizer may reduce I/O contention, implement the overlap of I/O operations and computation, and help to improve computation efficiency. As a result, the scalability of audio search can be significantly improved.

Audio search module Audio 600 also comprises a plurality of audio searchers 640A through 640N. Each audio searcher (e.g., 640A) is located in a processor to process a group assigned to the processor and to search for the target audio clip. Similar to an audio searching module 400 shown in FIG. 4, an audio searcher includes a feature extractor (e.g., 410), a modeling mechanism (e.g., 420), and a decision maker (e.g., 430). Each audio searcher conducts serial active search of an audio group assigned to it for a target audio clip by partitioning audio streams in the audio group into partially overlapped segments with length being the same as the target audio clip, extracting feature vector sequence for each segment, and modeling each segment using a CCGMM as illustrated in Equations (1) through (4). Additionally, the CCGMM for the target audio clip which is used by all of the audio searchers just needs to be estimated once by one of the audio searchers. Each audio searcher computes KL-max distance between the model for each segment and the model of the target audio clip. Based on the KL-max distance, an audio searcher may determine if the target audio clip is detected. Moreover, each audio searcher may skip a number of segments that following the current segment if the KL-max distance for the current segment is larger than a threshold.

FIG. 8 is pseudo code illustrating an example process 800 for performing robust and parallel audio search in a multiprocessor system. At line 802, audio search module may be initialized, e.g., target audio clip file and audio database file may be opened, and global parameters may be initialized. At line 804, a large audio database may be partitioned into NG smaller groups as illustrated in FIGS. 7A, 7B, and 7C. At line 806, a model (e.g., CCGMM) may be established for the target audio clip. At line 808, NG audio groups may be dynamically scheduled to available processors and parallel processing of the scheduled groups may be started. Line 808 uses one example instruction that sets up parallel implementation and other parallel implementation instructions may also be used.

Lines 810 through 846 illustrate how each of NG groups are processed and searched for the target in parallel by a processor in the multiprocessor system. It is worth noting that for illustration purpose, process in lines 812 to 846 is shown as iteration from the first group until the last group. In practice, if there are several processors available, several groups are processed in parallel by these available processors. At line 814, some or all of audio streams in each group may be further partitioned into NS partially overlapped segments if such streams are longer in time than the target audio clip. Line 816 starts iterative process for each segment of the group, shown in lines 818 through 832. At line 820, a feature vector sequence (frame by frame) may be extracted from the segment. At line 822, a model (e.g., CCGMM as shown in Equations (1) to (3)) may be established for the segment. At line 824, distance (e.g., KL-max distance as shown in Equation (4)) between the segment model and the target audio clip model may be computed. At line 826, whether the segment matches the target audio clip or not may be determined based on the distance calculated in line 824 and a predetermined threshold #1. If the distance is less than the threshold #1, the segment matches the target audio clip. At line 828, whether a number of following segments (e.g., M segments) in the same audio stream/substream may be skipped from searching may be determined based on the distance calculated in line 824 and a predetermined threshold #2. If the distance is larger than the threshold #2, M segments may be skipped from searching. In one embodiment, the number of segments to be skipped may vary depending upon the value of the distance. At line 830, the search results (e.g., index or starting time of a match segment in each group) may be stored in an array which is local to the processor that processes the group. At line 842, search results from local arrays from all of the processors may be summarized and outputted to a user.

Using the robust and parallel search strategy as outlined in FIG. 8 along with other techniques such as I/O optimization, search speed for a target audio clip in a large audio database in a multiprocessor system may be significantly improved. One experiment shows that search speed for a 15 second target audio clip in a 27 hour audio stream increases by 11 times on a 16-way Unisys system, compared to serial search of the same audio stream for the same target audio clip.

In one embodiment, a modified search strategy may be used. Using this strategy, a preliminary model (e.g., CCGMM) may be established for the first K frames (K>=1) of the target audio clip along with a full model for the entire target audio clip. Accordingly, a preliminary model (e.g., CCGMM) may be first established for the first K frames (K>=1) of an audio segment. During active search, the preliminary model of the first K frames of each audio segment may be first compared with the preliminary model of the first K frames of the target audio clip to produce a preliminary similarity measure. If the preliminary similarity measure indicates that these two preliminary models are significantly similar, a full model may be established for the entire audio segment and compared with the full model of the entire target audio clip; otherwise, no full model will be established for the audio segment and the next segment may be searched by first establishing a preliminary model for its first K frames and by comparing this preliminary model with the preliminary model of the target audio clip. This modified search strategy may further reduce computation load.

Although an example embodiment of the disclosed subject matter is described with reference to block and flow diagrams in FIGS. 1-8, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for searching an audio database for a target audio clip in a multiprocessor system, comprising:
    partitioning said audio database into a plurality of groups;
    establishing a model for said target audio clip;
    dynamically scheduling said plurality of groups to a plurality of processors in said multiprocessor system;
    processing said scheduled groups in parallel by said plurality of processors to search for said target audio clip, including partitioning each of said scheduled groups into at least one segment and for each segment:
        (a) extracting a feature vector sequence ("FVS") for the segment, and
        (b) modeling said FVS, based on a Gaussian Mixture model ("GMM") that includes a plurality of Gaussian components common for different segments and said target audio clip, by estimating mixture weights for each of said plurality of Gaussian components
        (c) computing a Kullback-Leibler ("KL") distance between a GMM of said segment and a GMM of said target audio clip; and
        (d) determining said segment matches said target audio clip when said KL distance is smaller than a predetermined threshold, and skipping processing a number of segments when said KL distance is larger than a predetermined value, said number of segments dependent on the value of said KL distance.

2. The method of claim 1, wherein partitioning said audio database comprises determining a size for each of said plurality of groups, said size being determined to reduce the amount of overlapped computation among said plurality of groups and load imbalance in parallel processing of said plurality of groups.

3. The method of claim 1, wherein establishing a model for said target audio clip comprises extracting a FVS from said target audio clip and modeling said FVS based on a GMM that includes a plurality of Gaussian components.

4. The method of claim 3, wherein modeling said FVS comprises estimating mixture weights for each of said plurality of Gaussian components.

5. The method of claim 1, wherein each of said at least one segment has the same length in time as that of said target audio clip.

6. The method of claim 1, wherein if there is more than one segment in an audio stream, each segment partially overlaps with a segment that immediately precedes that segment.

7. The method of claim 1 including:
    establishing a first preliminary model for a first and second frame of said target audio clip;
    partitioning each of said scheduled groups into at least one segment; and for each segment,
    extracting a first FVS for a first and second frame of the segment,
    establishing a second preliminary model for said first feature vector sequence based on a GMM including a plurality of Gaussian components,
    processing said scheduled groups to search for said target audio clip by comparing the first and second preliminary models to produce a preliminary similarity measure; and
    extracting a second FVS for every frame of the segment and establishing a full model for said second FVS based on the preliminary similarity measure exceeding a threshold.

8. An apparatus for searching an audio database for a target audio clip in a multiprocessor system, comprising:
    a partitioning module to partition said audio database into a plurality of groups;
    a scheduler to dynamically schedule said plurality of groups to a plurality of processors in said multiprocessor system; and
    an audio searching module for each of said plurality of processors, to process said scheduled groups in parallel by said plurality of processors to search for said target audio clip;
    wherein:
        (a) one of said audio searching modules comprises (i) a feature extractor to partition an input audio stream into at least one segment and to extract a feature vector sequence ("FVS") from each of said at least one segment, said at least one segment having the same length in time as that of said target audio clip; and (ii) a modeling module to model said FVS for each segment based on a Gaussian Mixture model ("GMM") that includes a plurality of Gaussian components common among all of the segments;
(b) one of said audio searching modules is to process said target audio clip by extracting a clip FVS from said target audio clip and model said clip FVS using said GMM that includes a plurality of Gaussian components common for said target audio clip and segments of said input audio stream; and
(c) one of said audio searching modules includes a decision maker to (i) compute a Kullback-Leibler ("KL") distance between a GMM of a segment of said input audio stream and a GMM of said target audio clip; (ii) determine whether said segment matches said target audio clip based on said KL distance, and (iii) determine how many segments are to be skipped from processing based on said KL distance.

9. The apparatus of claim 8, wherein said partitioning module further determines a size for each of said plurality of groups, said size being determined to reduce the amount of overlapped computation among said plurality of groups and load imbalance in parallel processing of said plurality of groups.

10. An article comprising a machine-readable medium that contains instructions, which when executed by a processing platform, cause said processing platform to perform operations comprising:
  partitioning said audio database into a plurality of groups;
  establishing a model for a predetermined, non-randomly selected target audio clip;
  dynamically scheduling said plurality of groups to a plurality of processors in said multiprocessor system; and
  partitioning each of said scheduled groups into at least one segment;
  after partitioning said audio database into the plurality of groups, processing said scheduled groups in parallel by said plurality of processors to search for said target audio clip
  wherein:
    (a) establishing a model for said target audio clip comprises extracting a feature vector sequence ("FVS") from said target audio clip and modeling said FVS based on a Gaussian Mixture model ("GMM") that includes a plurality of Gaussian components;
    (b) the FVS respectively includes a feature vector for every frame of a plurality of frames included in the target audio clip;
    (c) modeling said FVS comprises estimating mixture weights for each of said plurality of Gaussian components;
    (d) each of said at least one segment has the same length in time as that of said target audio clip;
    (e) said plurality of Gaussian components are common for different segments and said target audio clip; and
    (f) for each segment, (i) computing a Kullback-Leibler ("KL") distance between a GMM of said segment and a GMM of said target audio clip; (ii) determining that said segment matches said target audio clip when said KL distance is smaller than a predetermined threshold, (iii) skipping processing a number of segments when said KL distance is larger than a predetermined value, said number of segments dependent on the value of said KL distance, and (iv) the skipping processing includes skipping extracting a feature vector sequence for each of the skipped segments, the extracting otherwise occurring when said KL distance is smaller than the predetermined value, and the segments to be skipped are sequential, consecutive, and immediately follow said segment upon which the KL distance is based.

11. The article of claim 10, wherein partitioning said audio database comprises determining a size for each of said plurality of groups, said size being determined to reduce the amount of overlapped computation among said plurality of groups and load imbalance in parallel processing of said plurality of groups.

12. The article of claim 10, wherein processing said scheduled groups in parallel comprises:
  for each segment,
  extracting a FVS for the segment, and
  modeling said FVS for the segment based on a GMM that includes a plurality of Gaussian components;
  wherein the FVS respectively includes a feature vector for every frame of a plurality of frames included in the segment.

13. The article of claim 10, wherein if there is more than one segment in an audio stream, each segment partially overlaps with a segment that immediately precedes that segment.

* * * * *